H. HOFFMANN.
CAR BRAKE.
APPLICATION FILED APR. 23, 1909.

929,432.

Patented July 27, 1909.
2 SHEETS—SHEET 1.

WITNESSES
Geo. W. Naylor
F. A. Stimmer

INVENTOR
Henry Hoffmann.
BY Munn & Co
ATTORNEYS

H. HOFFMANN.
CAR BRAKE.
APPLICATION FILED APR. 23, 1909.

929,432.

Patented July 27, 1909.
2 SHEETS—SHEET 2.

WITNESSES

INVENTOR
Henry Hoffmann,
BY
ATTORNEYS

UNITED STATES PATENT OFFICE.

HENRY HOFFMANN, OF NEW ROCHELLE, NEW YORK.

CAR-BRAKE.

No. 929,432.      Specification of Letters Patent.      Patented July 27, 1909.

Application filed April 23, 1909. Serial No. 491,679.

*To all whom it may concern:*

Be it known that I, HENRY HOFFMANN, a citizen of the United States, and a resident of New Rochelle, in the county of Westchester and State of New York, have invented a new and Improved Car-Brake, of which the following is a full, clear, and exact description.

This invention relates to car brakes, and particularly to hand-operated brakes such as used on trolley cars, or similar cars.

The invention constitutes an improvement on my Patent No. 768,991, issued to me August 30, 1904.

The invention is particularly applicable where a brake drum is provided upon which a cable or chain is wrapped, the braking force being applied to the brake mechanism through the said chain.

An object of this invention is to provide a drum having an improved form which enables it to coöperate effectively with the brake mechanism, operating in such a way that the slack of the chain will be taken up rapidly in applying the brake, and when the shoes begin to press against the wheels the chain or chains wrap upon a smaller diameter of the drum so that the leverage being applied by the man operating the brake is relatively increased.

A further object of the invention is to arrange the chain or chains in such a way that they will tend to release the brake, and also to construct the brake drum with a special view to insuring a good lubrication thereof.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
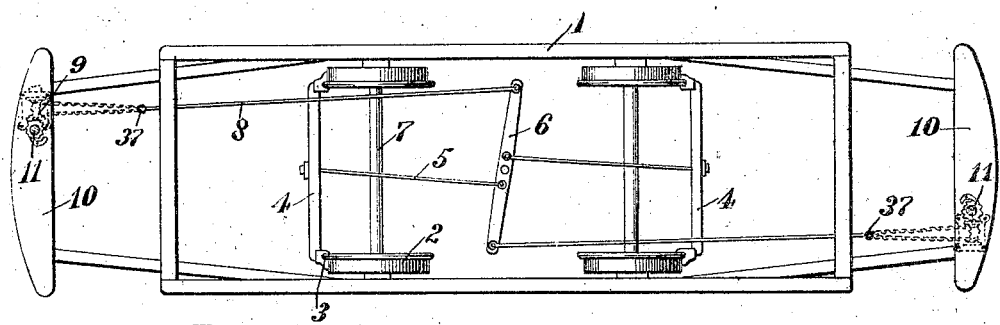
Figure 2:
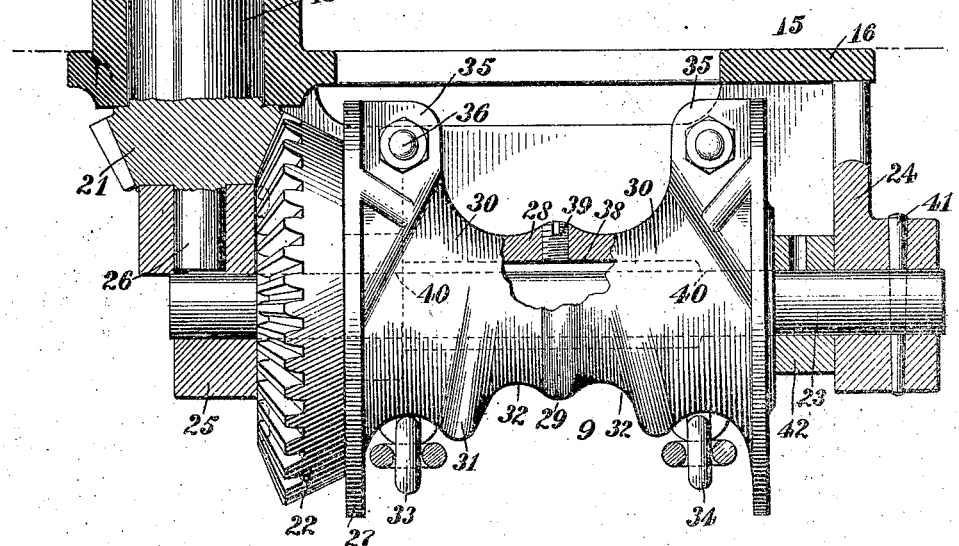
Figure 3:
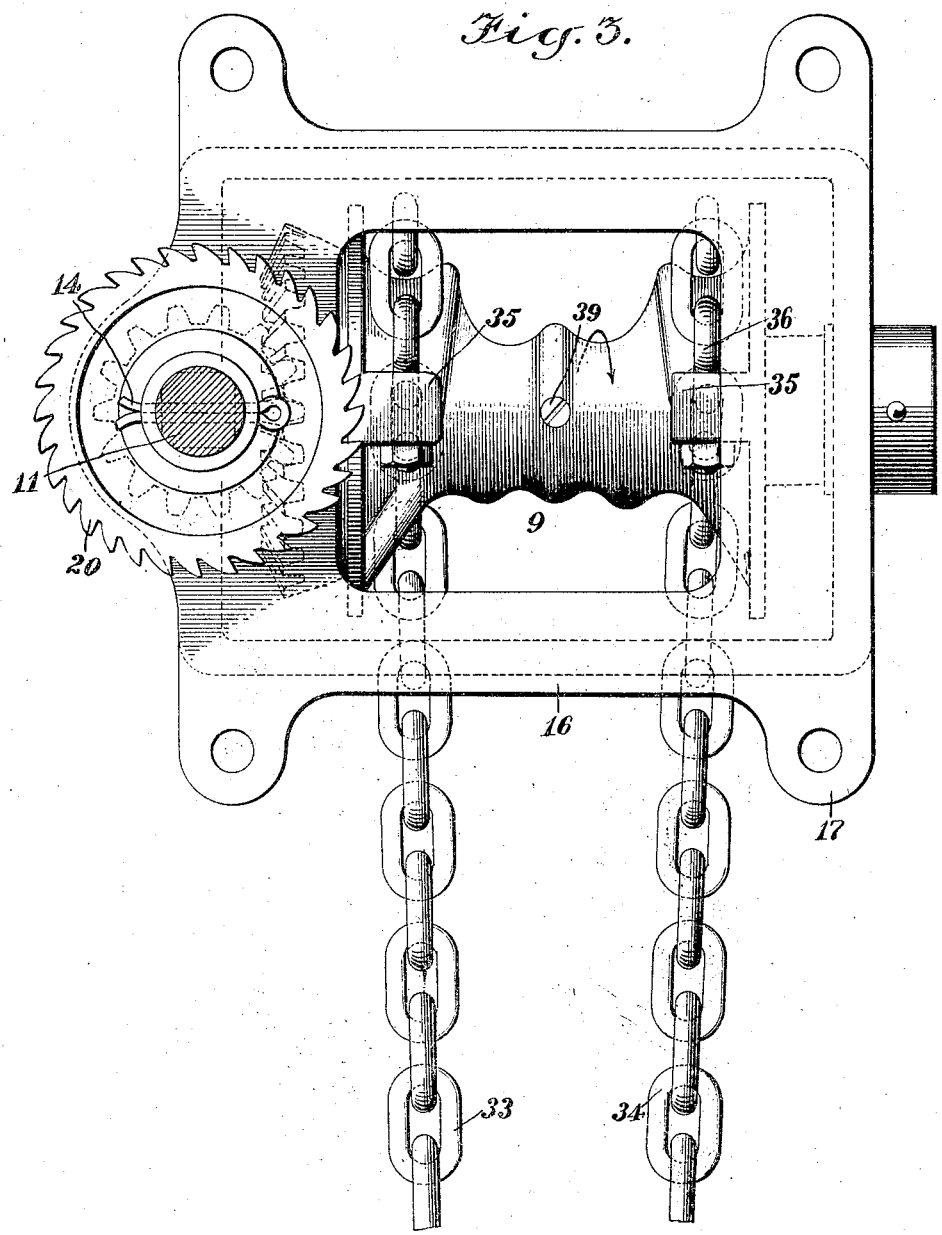

Figure 1 is a plan showing diagrammatically a car frame and brake mechanism, and illustrating the manner in which my invention is applied; Fig. 2 is a vertical section and partial elevation showing the brake drum and the means for actuating the same; and Fig. 3 is a plan of the brake drum and its frame, showing a portion of the chains which wrap upon the drum, and showing the brake spindle in cross section.

Referring more particularly to the parts, 1 represents the frame of the car which is mounted upon wheels 2, as shown. To these wheels 2, brake shoes 3 may be applied, the said brake shoes being carried on brake beams 4. These brake beams are attached near their middle points by links 5 to a floating lever 6 arranged midway between the axles 7. The ends of this floating lever 6 are connected by main links 8 with drums 9 mounted under the bumpers 10 at the ends of the car. These drums 9 are adapted to be operated by brake spindles 11 which are disposed in a vertical position in the usual manner at the front and rear platforms. The lower end of the spindle 11 seats in a square socket 12 which is formed in the upper end of a stub shaft 13 or pinion shaft, being secured thereto by a suitable split pin 14. The pinion shaft 13 and the drum 9 are mounted in a drum frame 15, having a horizontal substantially rectangular base plate 16 which is adapted to be attached to the under side of the car floor by bolts or similar fastening devices applied through corner lugs 17.

The stub shaft 13 is mounted in a boss or sleeve 18 formed at one end of the frame 15, and the upper end of this sleeve is substantially flush with the level of the car floor which is indicated by the line 19. On the upper end of the sleeve 18, a ratchet wheel 20 seats, and this ratchet wheel is rigid with the shaft 13. This ratchet wheel is the ratchet wheel which is usually provided and which coöperates with a pawl on the car floor and which is operated by the motorman's foot. The lower end of the stub shaft 13 is provided with a pinion 21 and this pinion meshes with a bevel gear wheel 22 which is rigidly attached to the end of the drum 9, both of these parts being secured rigidly to the drum shaft 23, the ends of which are rotatably mounted in hangers 24 and 25 which extend down from the frame 15. In the upper portion of the hanger 25 a bearing is formed for a center pin 26 which projects down from the pinion 21.

The drum 9 is formed with enlarged heads or flanges 27, and at the middle portion the drum is formed into a waist 28 of reduced diameter, but at the middle point it is slightly enlarged so as to form a dividing collar 29. From the waist 28 the diameter of the drum gradually increases toward the heads 27. For this reason the drum may be considered as being formed of two truncated cones 30, having their enlarged ends disposed remote from each other. On the cones 30, helical ribs 31 are formed which are respectively, right and left hand, that is, they are of opposite character. These ribs 31 form the surface of the cone into chain grooves 32 which guide the chains 33 and 34, as will be presently described. The flanges or heads 27 are provided at suitable points, as indicated in Fig. 3, with inwardly projecting lugs 35, and to these lugs the ends of the chains 33 and 34 are anchored by suitable eye-bolts 36. The other ends of the chains 33 and 34 are attached to rings 37 on the ends of the links 8. To the upper end of the spindle 11 the usual hand wheel is attached, which is not shown.

In the normal condition of the mechanism, that is, with the brakes not applied, the drum 9 has none of the chain wrapped upon it. In this connection attention is called to the fact that the chains wrap upon the drum from the under side, passing upwardly on the face of the drum on the side thereof remote from the brakes. On this account the weight of the chains tends to rotate the drum in a direction opposite to that indicated by the arrow in Fig. 3. This normally maintains the waist of the drum free from chain. When the brakes are to be applied, the rotation takes place in the direction of the arrow, and at the commencement of the movement, the slack of the chain is very rapidly taken up on account of the increased diameter of the drum near its ends. The chains, however, are guided by the chain grooves 32 toward the middle point of the drum where the diameter is reduced. In this way when the chains are about to apply their force to the brakes, they lead from a point on the drum having reduced diameter; this gives a man operating the hand wheel a greater leverage or purchase for applying the power to the brakes. In this way I produce an arrangement whereby the brakes can be very rapidly applied and with increased power at the point where the power is required. In addition to this, I provide improved means for lubricating the drum. For this purpose the middle portion of the drum is formed with an enlarged bore 38, and at the middle point of the drum a removable screw plug 39 is provided which may be removed so as to permit a lubricant to be introduced into the bore 38. At the points 40, near the heads of the drum, the bore of the drum fits the shaft, as indicated, so that a good bearing surface for the drum is formed on the shaft and at the same time the lubricant is retained. The shaft 23, it should be understood, is rigid in the hanger, being secured to the hanger 24 by a pin 41, as shown. Between the hanger 24 and the adjacent head of the drum, a collar 42 is provided.

For the lubricating material I may use a mixture which tends to harden at a high temperature, but which can be heated and poured into the opening closed by the plug 39.

By operating the brakes through the mechanism described, the gear wheels have a tendency to bring the car to a full stop without any perceptible jar. This effect results also from the fact that a chain is used in which the tension is gradually applied partly on account of the fact that the chain hangs in a substantially horizontal position. Attention is called to the fact that I do not provide sockets for the links on the face of the drum, and this is advantageous for the reason that it tends to prevent the links of the chain from becoming locked to the drum in unwinding. Furthermore, as I employ two chains the strain on the chains is divided. With a practical design of the mechanism the slack of the chain can be taken up rapidly and the car put under full control with about one turn of the brake wheel or handle. The brake can evidently be used for single truck, or for the heaviest kinds of rolling stock.

Special attention is called to the means set forth for lubricating the drum. With the arrangement described, the grease will be retained in the drum for a long time, and as long as there is grease present in the chamber of the drum, lubrication by other means is rendered unnecessary.

Having thus described my invention, I claim as new and desire to secure by Letters Patent,—

1. Brake mechanism, in combination with a drum having a waist of reduced diameter and having cones enlarging toward the ends of said drum, and cables connected with said brake mechanism to apply the braking force, the ends of said cables being attached to said drum near the ends thereof whereby said cables move toward the reduced waist as the braking force is applied.

2. Brake mechanism, in combination with a brake drum having a waist of reduced diameter and having enlarged heads, said brake drum having cones disposed between said waist and said head, helical guide ribs formed on said cones and extending from said waist toward said heads, said helical guide ribs being of opposite character, brake chains attached to said drum near said heads and adapted to wrap upon said cones, said ribs affording means for guiding said chains toward the waist as the chains coil upon the drum, and means for rotating said drum.

In testimony whereof I have signed my name to this specification in the presence of two subscribing witnesses.

HENRY HOFFMANN.

Witnesses:
E. D. AMMEN,
JOHN P. DAVIS.